United States Patent
Lange et al.

(10) Patent No.: US 7,743,423 B2
(45) Date of Patent: Jun. 22, 2010

(54) SECURITY REQUIREMENT DETERMINATION

(75) Inventors: Sebastian Lange, Seattle, WA (US); Gregory D. Fee, Seattle, WA (US); Aaron Goldfeder, Seattle, WA (US); Ivan Medvedev, Bellevue, WA (US); Michael Gashler, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1215 days.

(21) Appl. No.: 10/772,207

(22) Filed: Feb. 3, 2004

(65) Prior Publication Data

US 2005/0172126 A1 Aug. 4, 2005

(51) Int. Cl.
*H04N 7/16* (2006.01)
*G06F 17/00* (2006.01)
*G06F 11/30* (2006.01)
*G06F 9/44* (2006.01)

(52) U.S. Cl. ............... 726/26; 726/1; 726/30; 717/126; 717/131; 717/135; 717/100; 717/101; 717/124; 717/125; 717/127; 717/128; 717/129; 713/193

(58) Field of Classification Search ............ 717/100, 717/101, 124–129, 131, 135; 726/1, 26
See application file for complete search history.

(56) References Cited

U.S. PATENT DOCUMENTS

| | | | | |
|---|---|---|---|---|
| 5,915,085 A * | 6/1999 | Koved | ........................ | 726/1 |
| 5,958,050 A * | 9/1999 | Griffin et al. | ................ | 726/1 |
| 5,978,484 A * | 11/1999 | Apperson et al. | ............ | 705/54 |
| 6,012,100 A * | 1/2000 | Frailong et al. | ............ | 709/250 |
| 6,044,466 A * | 3/2000 | Anand et al. | ................. | 726/1 |
| 6,044,467 A * | 3/2000 | Gong | .......................... | 726/4 |
| 6,138,238 A * | 10/2000 | Scheifler et al. | .............. | 726/17 |
| 6,473,800 B1 * | 10/2002 | Jerger et al. | ................ | 709/226 |
| 6,490,679 B1 * | 12/2002 | Tumblin et al. | ............ | 713/155 |
| 6,735,758 B1 * | 5/2004 | Berry et al. | ................. | 717/130 |
| 7,076,557 B1 * | 7/2006 | LaMacchia et al. | ......... | 709/229 |
| 7,076,804 B2 * | 7/2006 | Kershenbaum et al. | ...... | 726/30 |
| 7,207,064 B2 | 4/2007 | Fee et al. | | |
| 2002/0019941 A1 * | 2/2002 | Chan et al. | ................. | 713/185 |

(Continued)

OTHER PUBLICATIONS

Larry Koved, Aaron Kershenbaum, Marco Pistoia, Access right Analysis for Java, Oct. 31, 2001, IBM Research Report, RC22224.*

(Continued)

*Primary Examiner*—William R Korzuch
*Assistant Examiner*—Trang Doan
(74) *Attorney, Agent, or Firm*—Lee & Hayes, PLLC

(57) ABSTRACT

All execution paths of one or more assemblies in managed code are simulated to find the permissions for each execution path. The managed code can correspond to a managed shared library or a managed application. Each call in each execution path has a corresponding permissions set. When the library or application has permissions to execute that are not less than the required permission sets for the execution paths, any dynamic execution of the library or application will not trigger a security exception. The simulated execution provides a tool that can be used to ensure that code being written will not exceed a maximum security permission for the code. A permission set can be determined by the tool for each assembly corresponding to an application and for each entry point corresponding to a shared library.

41 Claims, 6 Drawing Sheets

U.S. PATENT DOCUMENTS

2002/0174224 A1* 11/2002 Scheifler et al. ............. 709/225
2003/0041267 A1    2/2003 Fee et al.
2003/0225698 A1* 12/2003 Stefik et al. ................... 705/51
2004/0040017 A1*  2/2004 Kershenbaum et al. ..... 717/158
2004/0216150 A1* 10/2004 Scheifler et al. ............. 719/330
2004/0237067 A1* 11/2004 Sun et al. .................... 717/110

OTHER PUBLICATIONS

Larry Koved, Aaron Kershenbaum, Marco Pistoia, Access Rights Analysis for Java, Oct. 31, 2001, IBM Research Report, RC22224.*

Larry Koved, Aaron Kershenbaum, Marco Pistoia, Access Rights Analysis for Java, Oct. 31, 2001, IBM Research Report, RC22224.*

Larry Koved, Aaron Kershenbaum, Marco Pistoia, Access Rights Analysis for Java, Oct. 31, 2001, IBM Research Report, RC22224, pp. 1-14.*

David Wong and Rohyt Belani, Secure Programming with .Net, Nov. 26, 2002, http://www.securityfocus.com/infocus/1645, pp. 1-5.*

* cited by examiner

Possible Execution Paths of Assemblies 1-10
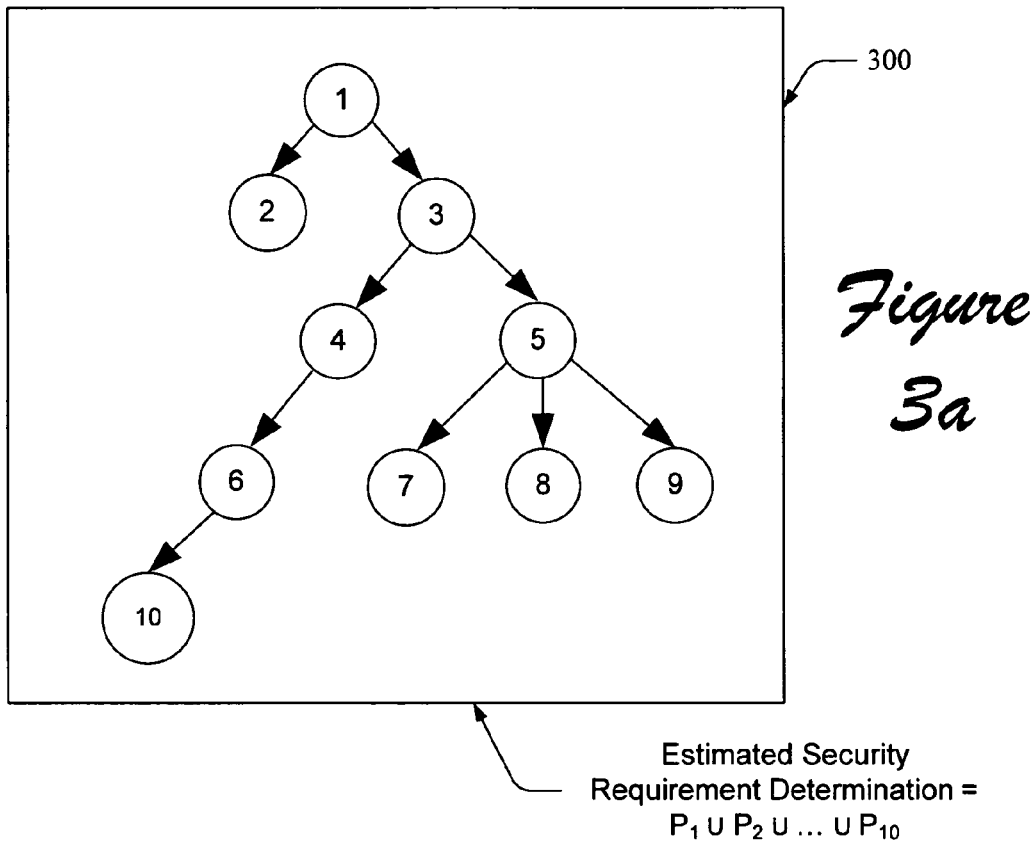
Estimated Security Requirement Determination = $P_1 \cup P_2 \cup \ldots \cup P_{10}$
*Figure 3a*
*Figure 3b*
Method Entry Points 1-10 in A One (1) Shared Managed Library 108
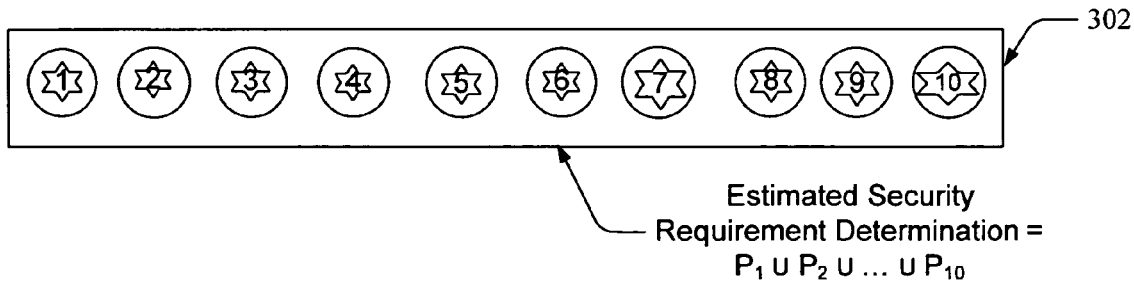
Estimated Security Requirement Determination = $P_1 \cup P_2 \cup \ldots \cup P_{10}$

SECURITY REQUIREMENT DETERMINATION

TECHNICAL FIELD

The present invention relates generally to the execution of managed code in a managed environment, and more particularly to an environment where a computing device compiles managed code into native code that is executed by a common language runtime via the computing device's operating system, where the managed code environment enforces partial trust security contexts.

BACKGROUND

An application program interface (API) for a network platform can be used by developers to build Web applications and services. One such API is the .NET™ platform created by Microsoft Corporation of Redmond, Wash., USA. The .NET™ platform is a software platform for Web services and Web applications implemented in a distributed computing environment. The .Net framework is not only intended for web services and application development, but is also intended as a general programming platform that enables both web services and application development as well as rich client application development. The .NET™ platform allows integration of a wide range of services that can be tailored to the needs of the user. As used herein, the phrase application program interface or API includes traditional interfaces that employ method or function calls, as well as remote calls (e.g., a proxy, stub relationship) and SOAP/XML invocations. The .NET™ platform uses a framework that includes a Common Language Runtime (CLR). Additional information regarding the basics of the .NET™ Framework can be found in a number of introductory texts, such as Pratt, *Introducing Microsoft .NET*, Third Edition, Microsoft Press, 2003.

The CLR is the heart of the Microsoft .NET™ Framework and provides the execution environment for all .NET code. Thus, code that is built to make use of the CLR, and that runs within the CLR, is referred to as "managed code." The CLR provides various functions and services required for program execution, including 'Just-In-Time' (JIT) compilation, allocating and managing memory, enforcing type safety, exception handling, thread management and security. The CLR is loaded upon the first invocation of a .NET™ routine. Because managed code is JIT compiled to native code prior to execution, significant performance increases can be realized in some scenarios. Managed code uses Code Access Security (CAS) to prevent assemblies from performing certain operations that could represent a security violation.

When writing managed code, the deployment unit is called an assembly which is a collection of one or more files that are versioned and deployed as a unit. An assembly is the primary building block of a .NET™ Framework application. All managed types and resources are contained within an assembly and are marked either as accessible only within the assembly or as accessible from code in other assemblies. An assembly is packaged as a data link library (DLL) file or executable (EXE) file. While an executable can run on its own, a DLL must be hosted in an existing application.

One or more methods in an assembly may call to access protected resources associated with another method. This call can be a cross assembly call (e.g., a call to a different assembly), or the call can be a call from one method to another within the same assembly. Various permissions can be requested by a method that contains security relevant resources, and various permissions can be assigned to each method. The assembly that contains the caller method must have been granted the required permissions before access is provided to the protected security relevant resources. Otherwise, a security exception will be triggered.

As a developer develops an application that will run in a managed environment, the application can be successively executed in order to find out if the application's source code has been written so that it will operate correctly in the targeted security context Alternatively, a manual review of every line of code in the application being developed can be made to try to find the security requirements associated with the calls that would be made during an actual execution of the application. Then, the results of the manual review can be summarized as to the security requirements for its execution. This summary can then be compared to a maximum level of security that the developer may not exceed for the application being developed.

Of course, both the try-and-error execution technique and the manual review technique can be time consuming and impractical to perform, as knowledge of the code in assemblies not written by the developer is required, i.e., a security check might be triggered by a shared managed library that the developer uses in order to implement a feature. It would be an advance in the art to provide an efficient technique to derive what the minimum security requirements are for executing managed code prior to a deployment of the managed code, prior to a release of the managed code, and/or prior to an actual execution of the managed code.

SUMMARY

In one implementation, a tool is provided that estimates security requirements needed to execute managed code so as to avoid a security exception. In another implementation, all execution paths of assemblies in managed code are statically simulated to find a set of permissions for each execution path, where each call in each execution path has a corresponding permissions set The managed code can be a managed shared library or an assembly.

In a still further implementation, a computing environment for a computing device has managed and native code portions and logic. The managed code portion includes a virtual machine and a plurality of assemblies each being managed code in a managed shared library (data link library—DLL) or in an executable (EXE). The native code portion includes an execution engine for the virtual machine and an operating system under the execution engine. The logic is configured to simulate the execution of all possible calls from one assembly to another for all possible execution paths of managed code, where each assembly call has a corresponding permissions set The logic derives a union of the permissions sets from each assembly call. The union can be used to estimate security requirements needed to execute the managed code so as to avoid a security exception.

In yet another implementation, a static simulation is performed of the execution of every data and control flow for managed code. From the simulated execution, an estimate is derived of the minimum security requirements needed to dynamically execute the managed code without triggering a security exception.

BRIEF DESCRIPTION OF THE DRAWINGS

A more complete understanding of the implementations may be had by reference to the following detailed description when taken in conjunction with the accompanying drawings wherein:

FIG. 3a depicts a plurality of assemblies and all possible execution paths of a corresponding application through the assemblies, as well as the union of the permission sets required for execution of the possible execution paths.

FIG. 3b depicts a plurality of entry points in a shared managed library, as well as the union of the permission sets required for executions that are associated with the entry points.

Figure 1:
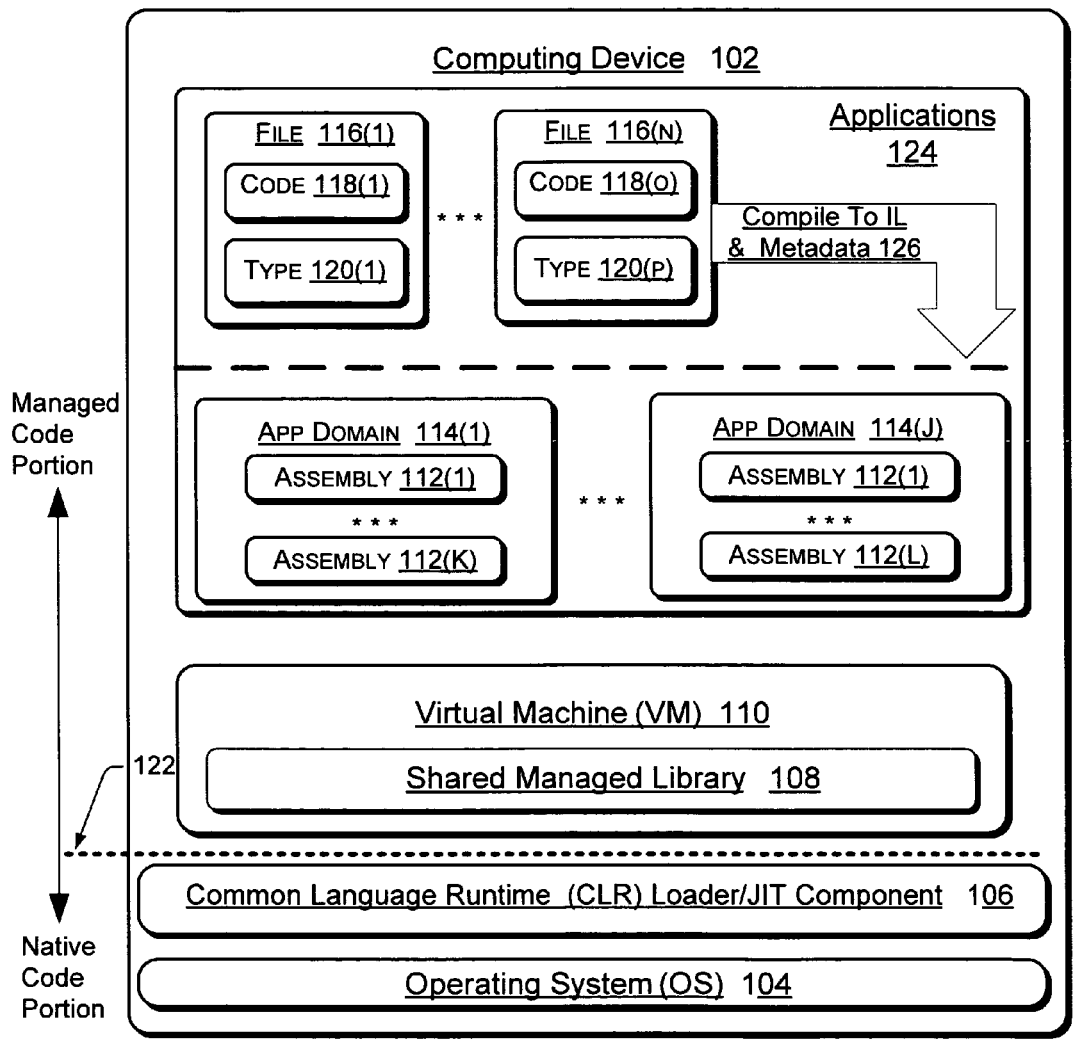
FIG. 1 illustrates one embodiment of an environment for computing device having a virtual machine (VM) in a managed code portion, where the managed code portion includes a shared managed library and a plurality applications each of which includes one or more files having different file types, where the files are complied into one or more assemblies that can be placed within one or more application domains for execution, and where the environment has a native code portion that includes a common language runtime and an operating system.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

It is advantageous to simulate the execution of an application in order to find out what permissions will be requested by the corresponding managed code that might be called during an actual execution of the application. The managed code corresponds to one of more assemblies each of which is associated with permissions (e.g., a permission grant set). An assembly includes one or more methods. Each method requires actual permissions to be executed without a security exception being triggered. In essence, an application is mapped, via one or more corresponding assemblies, to an application domain (e.g., an executable—EXE). Stated otherwise, one or more assemblies can be put into an application domain to be executed. As such, an application that has an application manifest with security requests will have permissions (e.g., a permission grant set) through its corresponding one or more assemblies. Accordingly, when a first assembly calls a method on a second assembly, the second assembly has two (2) corresponding permission sets: (i) the grant set of the second assembly, and (ii) the union of the permissions required to call that method without a security exception being triggered.

After an application has been simulated and the permissions requested by the corresponding managed code are known for an actual execution of the application, the security requirements for running the application, without the occurrence of a security exception, can be estimated. This estimate can be used by a developer of the application to verify whether the corresponding code meets, or fails to meet, the level of security that the application is likely to be granted. If there is a failure, the developer can modify the managed code and use an implementation of the estimation tool until it is found that the level of security that the application is likely to be granted matches what is required for its actual execution.

The total security requirements for using a shared managed library can be also be estimated. To do so, an execution simulation is made for each assembly in the library. In that a library may have multiple known or 'public' entry points, all data and control flows from each entry point are examined in the simulated execution. From each public entry point, each method in each assembly may call for access to another method in another assembly. For each such call, certain permissions are required in order to prevent a security exception from occurring during an actual execution. By finding a set of permissions (e.g., for instance, the union of all these permissions), security requirements for using the shared managed library can be estimated. Additionally, a simulated execution of the shared managed library can be made to produce separate permission sets for each library entry point, which information can be used by application writers that consume some, but not all, of the functions of the shared managed library.

Normally an application has only one (1) known entry point through which corresponding assemblies can be executed. The assembly defines a security boundary. The Common Language Runtime (CLR) implements a Code Access Security (CAS) system. What each caller method of each assembly is allowed to do depends on the intersection of what permissions that caller method requests and what permissions are granted to that caller method at the time when the caller method is executed. The CAS security allows the execution of assemblies in restricted security contexts, meaning that all methods in the respective assembly can only call those methods that do not demand any permissions or that demand only those permissions that the assemblies have been granted. The following discussion presents implementations for estimating, through a simulated execution of all code paths corresponding to an application or of a shared library, the level of security that will be required in order to execute the application or shared library correctly in the intended security context.

Computing Device Environment

FIG. 1 shows an implementation that illustrates a computing device 102 utilizing a virtual machine (VM) 110 having architecture to run on different platforms. VM 110 is stacked on an interface 122 between a managed code portion and a native code portion. According, interface 122 can be an interface to different operating systems and different applications.

The native code portion includes an operating system 104. Over the operating system 104 is a module 106 that include a CLR loader and a Just-In-Time (JIT) compiler component. The managed code portion includes applications 124 with corresponding files 116(*n*), application (app) domains 114(*j*), and VM 110. Each file 116(*n*) has a respective type 120(*p*) and a user code 118(*o*) that can be coded in a variety of different programming languages.

FIG. 1 illustrates an exemplary arrow 126 where files 116 having different file types 120(*p*) are compiled into an Intermediate Language (IL) and metadata contained in one or more managed assemblies 112(1-K), (1-L) within respective app domains 114(1-J). As such, this compilation 126 enables the files 116 of arbitrary (and possibly expanded/extended) types 120(*p*) to be compiled into at least one managed assembly 112 within one application (app) domain 114.

It should be understood that each file 116(*n*) may not physically include its code 118(*o*). However, the source code for each code 118(*o*) is inferable or otherwise derivable from the contents of its file 116(*n*). Although a finite number of files 116 and types 120 are illustrated in and/or indicated by FIG. 1, any number of files 116 and types 120 may be involved in compilation 126. Compilation 126 may comprise a pluggable build architecture that interfaces with modules assigned to files 116. These modules may be tailored to the corresponding arbitrary file types 120 of files 116 in order to facilitate a compilation 126 of their code 118 into a target managed assembly 112 within an app domain 114.

The CLR loader of component 106, which is stacked upon the computing device's 102 operating system 104, operates in the native code portion as the execution engine for the virtual machine 110. The JIT aspect of component 106 compiles managed assemblies 112 (1-K), (1-L) within respective app domains 114(1-J) into native code to be executed by the CLR loader of component 106. Accordingly, computing device 102 provides a virtual machine 110 operating in a managed code portion for executing applications 124.

Figure 2:
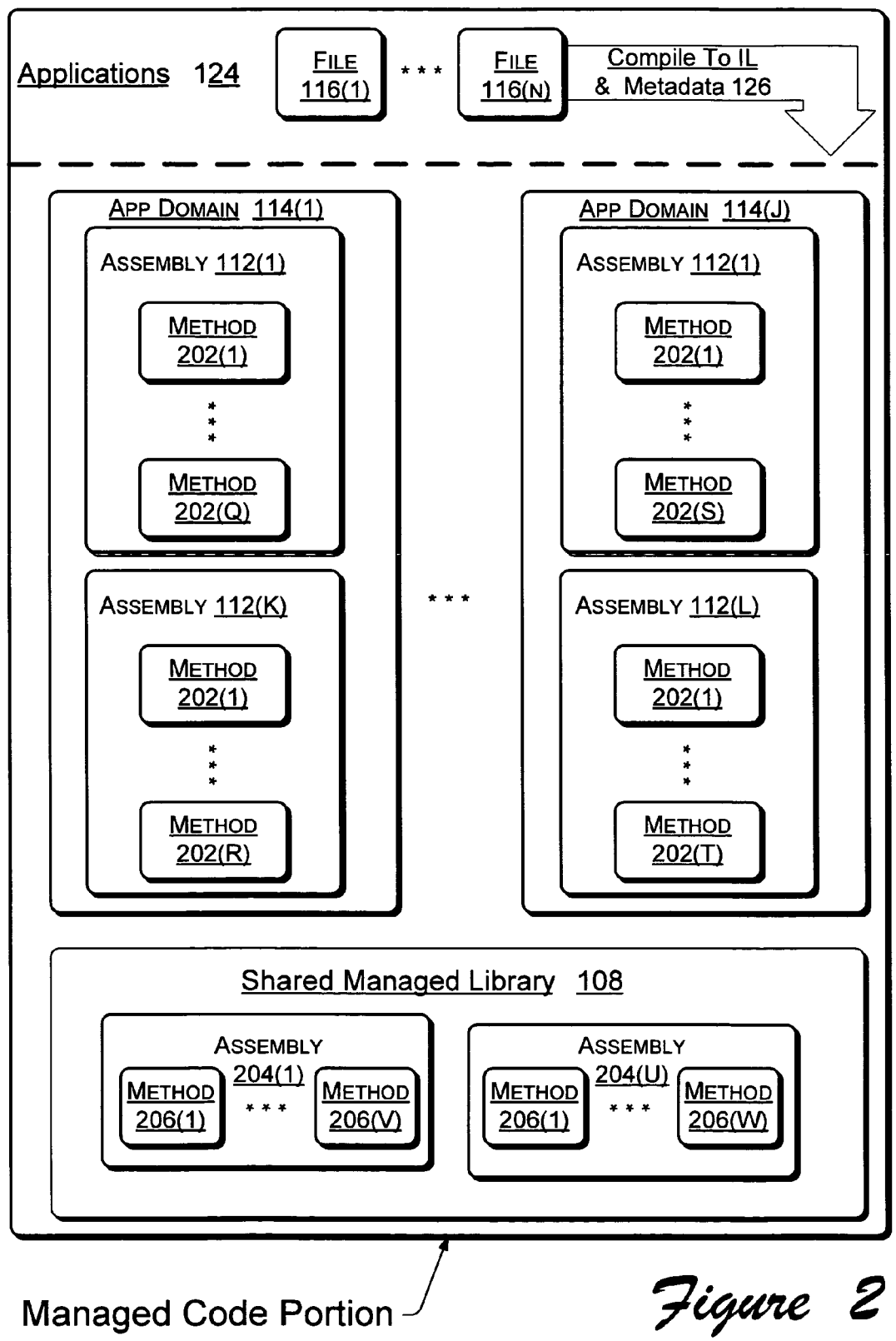
FIG. 2 depicts in further detail the managed code portion of the environment of FIG. 1, where each assembly can be placed into each application domain for execution and the shared managed library includes one of more methods.

The managed code portion of FIG. 1 is further illustrated FIG. 2 and particularly shows the presence of one or more methods that are associated with each assembly. In particular, one or more assemblies 112(*k*), (*l*) can be placed into each app domain 114(*j*) for execution. Each assembly 112(*k*), (*l*) can include one or more methods 202. Shared managed library 108 also includes one or more assemblies 204(*u*) each of which includes one or more methods 206(*v*), (*w*). In the case of the NET product produced by Microsoft Corporation, the shared managed library 108 can be a base class library for the NET framework. Each application 124 corresponds to one or more assemblies 112(*k*), (*l*) for which there is one (1) known or 'public' entry point from which execution of the application 124 begins. During execution, a method in one assembly may call for access to another method in a different assembly. Both caller and callee methods can be in the same or a different app domain (*j*). The callee method can also be with in an assembly (*u*) of the shared managed library 108. In a cross assembly call from caller to callee, the caller is required to have certain permissions in order to have access to protected resources associated with the callee. If the caller lacks the necessary permissions, a security exception will occur. If no security exception occurs, the caller is permitted access to the callee. After access has been verified, in one scenario, the JIT aspect of component 106 compiles the corresponding managed code into native code to be executed by the CLR loader of component 106 as shown in FIG. 1.

The execution of an application 124(*a*) can be simulated statically, that is—without actually running the corresponding managed code, in order to simulate all possible calls and the corresponding flow of argument data using intra and extra method data flow analysis. This simulation can include an exhaustive gathering of the permission sets corresponding to all methods in all assemblies in application 124(*a*) that call other methods. The simulated execution of application 124(*a*)'s managed code provides an estimate of what types of permissions the actual execution will require. A graphical depiction 300 of an all possible calls during a simulated execution of the managed code corresponding to an application 124(*a*) is seen in FIG. 3*a*. During an actual execution of application 124(*a*), managed code corresponding to ten (10) different assemblies could be executed. As shown in depiction 300, assembly 1 can only be a caller, assemblies 2, 7-9, and 10 can only be callees, and assemblies 3-6 can be both caller and callee. To estimate the permissions required for an actual execution of application 124(*a*), the union of all permissions for accessing each of the assemblies 1-10 is found. This union is represented by $P_1 \cup P_2 \cup \ldots \cup P_{10}$. Once this union is found, it can be associated as a required permission set with application 124(*a*), such as by placing the permission set in a manifest that can be accessed by other applications. Alternatively, in the permissions for all the methods called by the assemblies 1-10 that correspond to an application, there might be methods in assembly 10 that are never called by the application but, if called, would require a higher level of trust.

The execution of each assembly of managed code that corresponds to application 124(*a*) can be simulated to find the minimum required permission set such that its actual execution is likely not to trigger a security execution. The union of all minimum required permission sets across all assemblies for managed code corresponding to application 124(*a*) will provide the minimum required permission sets for an actual execution of application 124(*a*). A developer of application 124(*a*), or any component thereof, can use the estimated permission sets gathered from the corresponding simulation in various ways. Implementations include an accounting for not only the assemblies that are directly part of the application, but also include an accounting for the assemblies that are in shared libraries or in the operating system. As such, not just assemblies of the application written by an application developer are accounted for, but also system assemblies are included in the accounting. This accounting is part of the search through the transitive closure of all call graphs starting with each entry point of one or more assemblies corresponding to the application or with each entry point of a shared library under investigation. Accordingly, the developer, for instance, may use the results to further debug or refine the managed code being developed so that the developer's code can be made to be consistent with known security requirement limitations.

FIG. 3*b* shows ten (10) method entry points in one (1) exemplary shared managed library 108. Unlike an application, which corresponds to only one (1) public entry point, the shared managed library 108 has multiple public entry points. In order to evaluate the permissions that are required for any use of the library 108, each method entry point 1-10 is evaluated, where each method entry point can correspond to a module from a data link library (e.g., *.dll). The evaluation includes an estimate for the permissions required to access each method entry point 1-10. A method within an assembly in library 108 may call another method in a different assembly. Each such call will have an associated permission set. A union of the resulting permission sets for each method in each assembly in library 108 yields the required permission sets for any use of library 108, where any such use is likely not trigger a security exception. This union is represented by $P_1 \cup P_2 \cup \ldots \cup P_{10}$. Once this union is found, it can be associated with library 108, such as by placing the permission set in a manifest that can be accessed by other applications. Alternatively, a developer of library 108 can use the permission sets derived from the simulation to further develop, debug, or refine the components of the library 108, including its assemblies and corresponding methods. Shared libraries often can have multiple assemblies (e.g., multi-module assemblies), although typically one (1) assembly calls into other shared assemblies.

Figure 4:
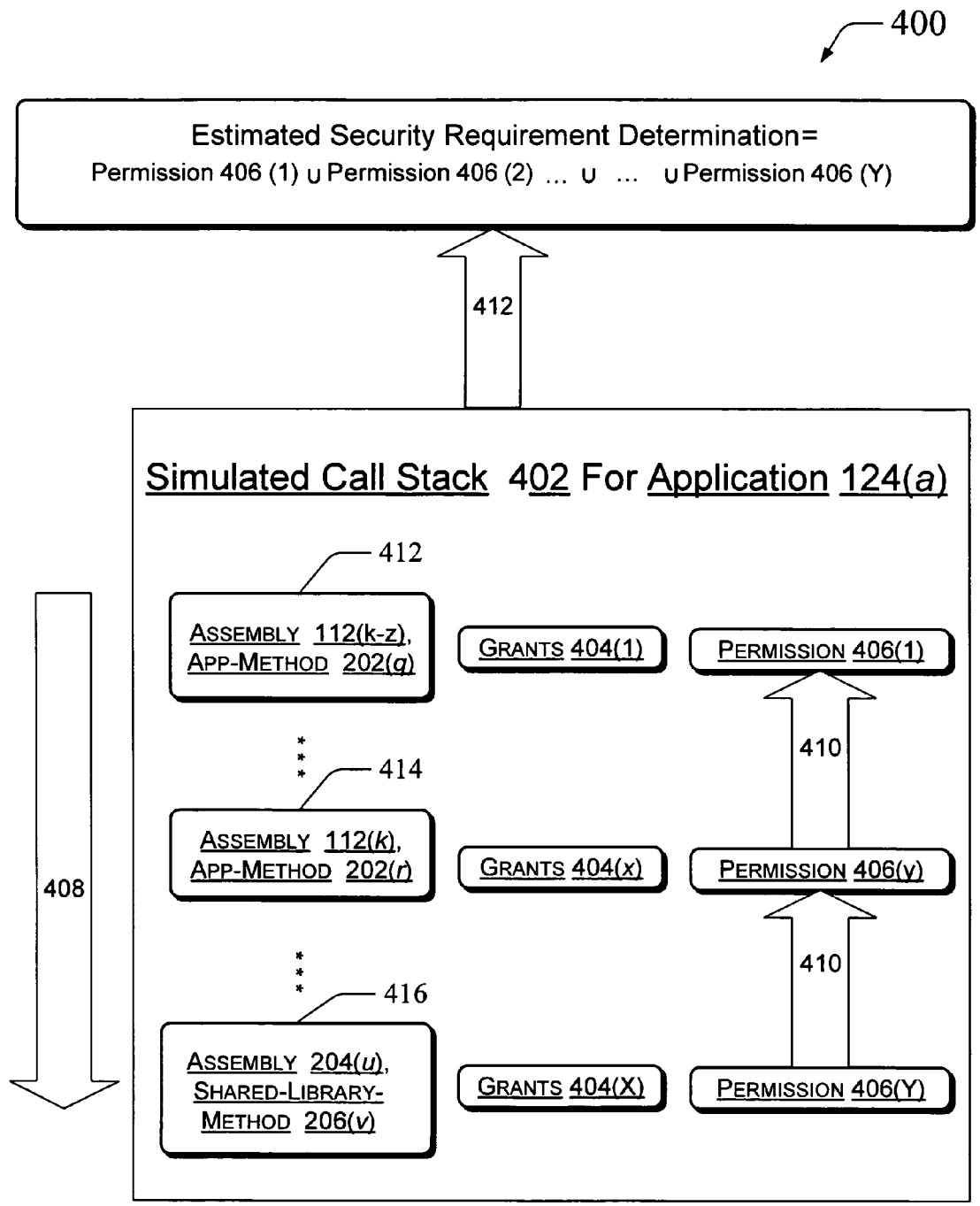
FIG. 4 depicts all possible control and data flows through the methods in one or more assemblies that correspond to an application, where a set of grants and a set of permissions are associated with each method, where an estimation of the security requirements is made for executing the application without the occurrence of a security exception, and where the estimated security requirements are derived from the union of all the permission sets.

FIG. 4 presents a flowchart of an exemplary process 400 for estimating the security requirements for application 124(a) to be executed without the occurrence of a security exception. This estimation is made by a simulation of an execution of managed code corresponding to application 124(a). As part of the simulation, one or more simulated call stacks 402 are formed. Arrow 408 indicates that the simulated call stack 402 grows downward with the number of assemblies that are in an execution path. As shown at block 416 of FIG. 4, a method 206(v) of a 'shared library assembly 204(u)' demands a permission 406(Y) of its caller in order for the calls to have access to its corresponding protected resources. Each assembly corresponding to an application in the simulated call stack 402, shown in FIG. 4 as an 'application assembly 112', has a set of corresponding grants 404. Each application assembly 112 on the simulated call stack 402 has a method seen in FIG. 4 has an 'application method 202'. FIG. 4 also shows a 'shared library method 206(v)' in an assembly associated with a shared library.

The CAS allows an administrator to specify privileges that each managed assembly has, based on a degree of trust, if any, in that managed assembly. When managed code makes a runtime call to access a protected resource, the runtime checks to see whether the administrator has granted the required privileges for access to that assembly. The CLR 'walks' the call stack from the called assembly up to the top of the call stack when performing this check so that an untrusted top level assembly will not bypass the security system by employing trusted malicious code lower down in the call stack. An administrator can grant an assembly various security permissions, such as enabling the assembly to execute, allowing calls to be made to unmanaged assemblies, enabling the assembly to create and control application domains, etc.

During an actual execution, permission 406(Y) of block 416 will be compared with the corresponding set of grants 404 for all of the callers above block 416, as indicated by arrows 410. This access check is performed in the CLR of component 106 seen in FIG. 1. If permission 406(Y) is met by each of the grants in the simulated call stack 402, then the execution of shared library method 206(v) will be able to run without triggering a security exception.

Once every possible code path for application 124(a) has been simulated, such as has been demonstrated for shared library method 206(v), and all corresponding permissions 406 have been gathered, the union of these is found as shown by arrow 412. This union, which is expressed as Permission 406(1) u Permission 406(2) u . . . u Permission 406(Y), represents the minimum permission set that is required to execute application 124(a) without triggering a security exception. Similarly, estimates can be made of the minimum security requirements that would be triggered against other managed code. Such managed code includes an application through its corresponding assemblies or an individual assembly, where the assembly is one or more files that can contain all managed types and resources and which can be marked as being either accessible only within the assembly or as accessible from code in other assemblies.

The CAS has a policy system that grants assemblies permissions to access protected resources. The CAS also has an enforcement system that includes methods that expose security relevant resources (e.g., file or registry access). This enforcement system demands that callers of the security relevant resources have been granted the appropriate permission(s) by the CAS policy system. Accordingly, implementations feature a tool for estimating the permission checks that are triggered either against an application through its corresponding one or more assemblies or through a shared library entry point.

Figure 5A:
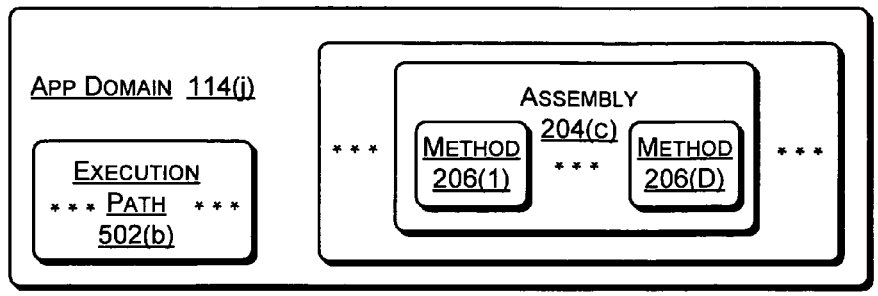
FIG. 5a is an exemplary data structure representing an application domain that corresponds to an application that is put into the application domain for execution

FIG. 5a depicts an exemplary app domain 114(j) representing managed code corresponding to an application 124(a) through its corresponding assemblies 204(1) through 204(C). Each assembly 204(1-C) can be put into app domain 114(j) for execution. Each assembly 204(c) is associated with one of more methods 206(d). Assemblies 204(1-C) can have a plurality of execution paths 502(1-B). Each execution path 502(b) represents a different data and control flow.

Figure 5B:
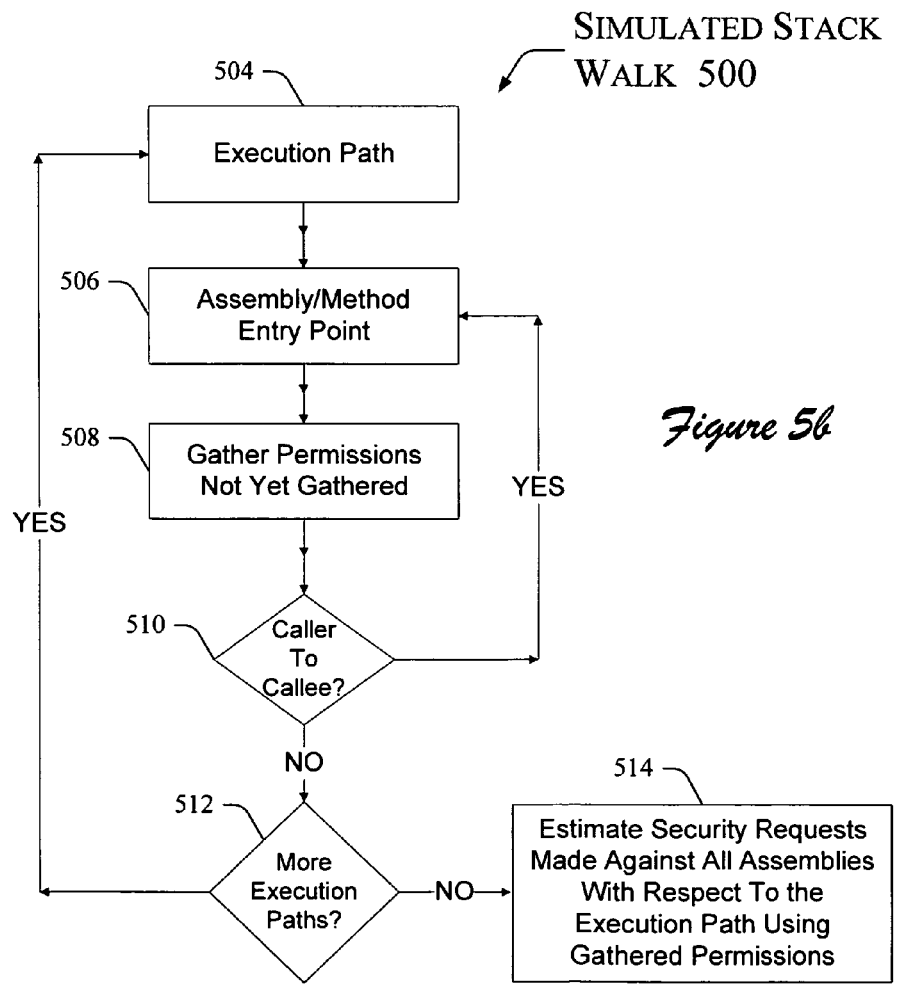
FIG. 5b is a flowchart for an implementation in which a simulated execution follows all possible code paths from an entry point of each of one or more assemblies associated with an application in order to estimate corresponding security requirements for executing the application.

FIG. 5b illustrates an exemplary process 500 that simulates stack walks for one or more assemblies corresponding to an application. Stated otherwise, process 500 simulates all possible flows of argument data using intra method and extra method data flow analysis in a static simulation of the execution of the one or more assemblies corresponding to the application. Moreover, process 500 uses the stack walk procedure for all possible execution paths that correspond to the application. Assemblies that correspond to the application typically do, but do not have to, execute within a single application domain. This stack walk procedure simulates all possible execution paths in order to find the security needs of the application in the context of its execution in the CLR where partial trust security contexts can be enforced.

At block 504 of process 500, an execution path in entered. Process 500 moves to block 506 where a public entry point of a method in an assembly is entered. Thereafter, the permission set for the method in the assembly is gathered at block 508. If the permission set for that method had been previously gathered (e.g., for every method that has been reached, all of the relevant security requirements for that method have been directly gathered), a duplication of such gathering can be avoided if the same method is later called by another method. After the permission set has been gathered, or a duplicate of such gathering can be avoided, process 500 passes control to a query 510. Query 510 determines whether the method calls another method. If the method calls another method, the control of process 500 moves to block 506 which represents the entry point of the method being called. Process 500 then continues as set forth above.

If query 510 determines that the method does not call another method, then process 500 moves to a query 512. At query 512, it is determined whether there are any more execution paths that have not yet been simulated by stack walking. If so, then control of process 500 moves back to block 504 for a simulation of an execution starting at the next execution path. If, however, query 512 determines that all of the execution paths of the assemblies corresponding to the application have been simulated by the stack walking procedure, then all permission sets of each execution path for the assemblies corresponding to the application will be deemed to have been gathered. Once query 512 is determined in the affirmative, control of process 500 moves from query 512 to a block 514.

At block 514, an estimate of security requests is made against all assemblies corresponding to the application with respect to all execution paths. This estimate uses the gathered permissions. The gathered permissions can represent a set of permissions. This set of permissions can be the union of all permission sets across all possible execution paths of the assemblies corresponding to the application. This union represents a predetermined estimation of the security requirements that will be triggered against the assemblies corresponding to the application during their actual execution. This estimation provides an understanding of what privileges the corresponding managed code would require in order to have an actual execution that would not be likely to trigger a security exception.

Process 500 can be applied similarly to a shared managed library to estimate the minimum required security access privileges in order to fully use the library while avoiding an security exception. The application of process 500 to a shared managed library would be different in that block 504 would represent an entry point for an assembly and block 512 would represent a query as to whether there were any more assemblies in the library for which the execution had not yet been simulated. Finally, block 514 would refer to the shared managed library rather than to the assemblies corresponding to an application.

Figure 6:
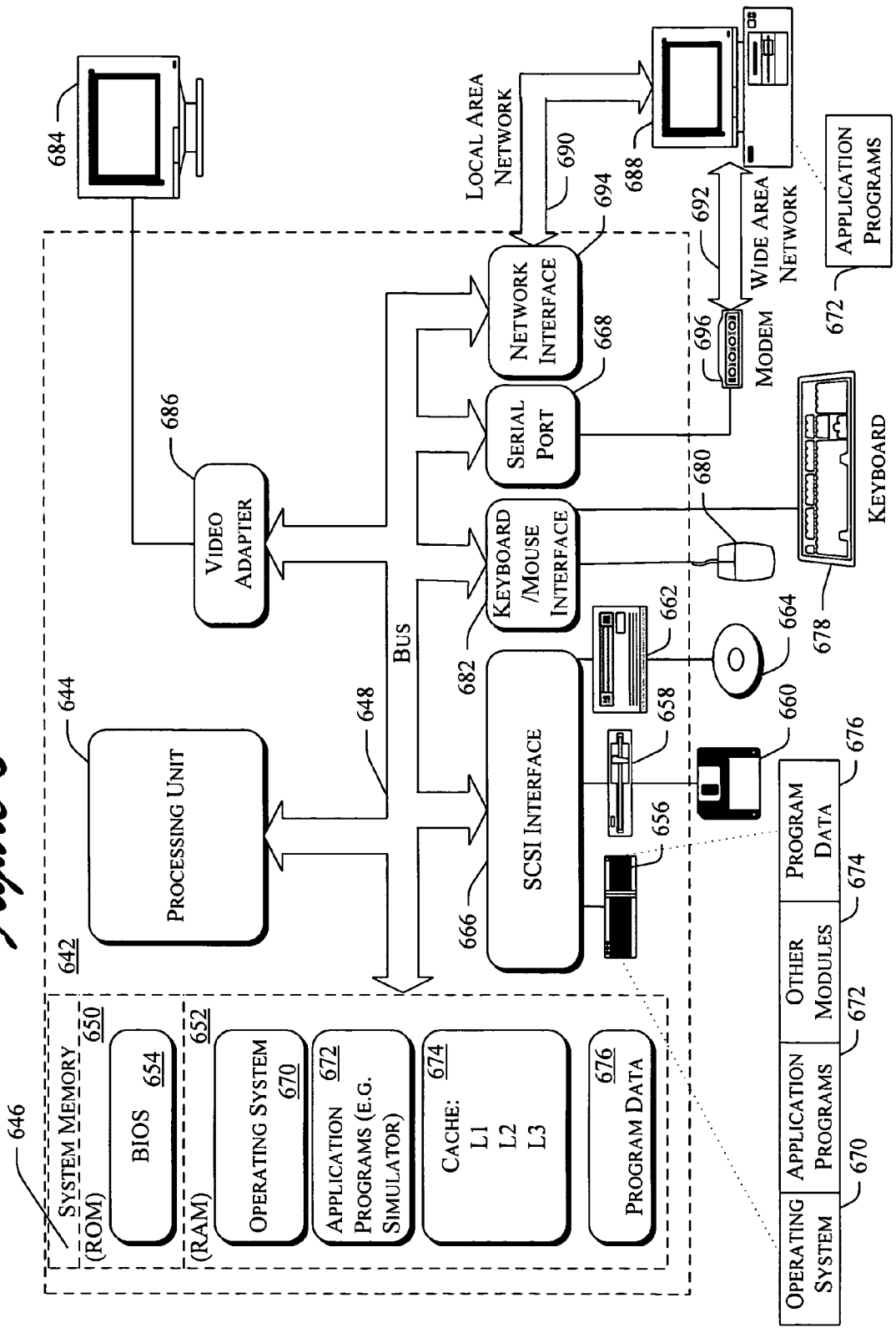
FIG. 6 is a block diagram of an exemplary environment capable of supporting an exemplary computing device of FIG. 1.

A Computer System FIG. 6 shows an exemplary computer system that can be used to implement the processes described herein. Computer 642 includes one or more processors or processing units 644, a system memory 646, and a bus 648 that couples various system components including the system memory 646 to processors 644. The bus 648 represents one or more of any of several types of bus structures, including a memory bus or memory controller, a peripheral bus, an accelerated graphics port, and a processor or local bus using any of a variety of bus architectures. The system memory 646 includes read only memory (ROM) 650 and random access memory (RAM) 652. A basic input/output system (BIOS) 654, containing the basic routines that help to transfer information between elements within computer 642, such as during start-up, is stored in ROM 650.

Computer 642 further includes a hard disk drive 656 for reading from and writing to a hard disk (not shown), a magnetic disk drive 658 for reading from and writing to a removable magnetic disk 660, and an optical disk drive 662 for reading from or writing to a removable optical disk 664 such as a CD ROM or other optical media. The hard disk drive 656, magnetic disk drive 658, and optical disk drive 662 are connected to the bus 648 by an SCSI interface 666 or some other appropriate interface. The drives and their associated computer-readable media provide nonvolatile storage of computer-readable instructions, data structures, program modules and other data for computer 642. Although the exemplary environment described herein employs a hard disk, a removable magnetic disk 660 and a removable optical disk 664, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 656, magnetic disk 660, optical disk 664, ROM 650, or RAM 652, including an operating system 670, one or more application programs 672 (such as the managed code execution simulation application discussed above), cache/other modules 674, and program data 676. A user may enter commands and information into computer 642 through input devices such as a keyboard 678 and a pointing device 680. Other input devices (not shown) may include a microphone, joystick, game pad, satellite dish, scanner, or the like. These and other input devices are connected to the processing unit 644 through an interface 682 that is coupled to the bus 648. A monitor 684 or other type of display device is also connected to the bus 648 via an interface, such as a video adapter 686. In addition to the monitor, personal computers typically include other peripheral output devices (not shown) such as speakers and printers.

Computer 642, which can be a server or a personal computer, commonly operates in a networked environment using logical connections to one or more remote computers, such as a remote computer 688. The remote computer 688 may be another server or personal computer, a router, a network PC, a peer device or other common network node, and typically includes many or all of the elements described above relative to computer 642. The logical connections depicted in FIG. 6 include a local area network (LAN) 690 and a wide area network (WAN) 692. Such networking environments are commonplace in offices, enterprise-wide computer networks, intranets, and the Internet.

When used in a LAN networking environment, computer 642 is connected to the local network through a network interface or adapter 694. When used in a WAN networking environment, computer 642 typically includes a modem 696 or other means for establishing communications over the wide area network 692, such as the Internet. The modem 696, which may be internal or external, is connected to the bus 648 via a serial port interface 668. In a networked environment, program modules depicted relative to the personal computer 642, or portions thereof, may be stored in the remote memory storage device. It will be appreciated that the network connections shown are exemplary and other means of establishing a communications link between the computers may be used.

Generally, the data processors of computer 642 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available tangible media that can be accessed by a computer. By way of example, and not limitation, computer readable media may comprise "computer storage media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information and which can be accessed by a computer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented on a computing device having instructions stored on a computer-readable storage media and executable by a processor, to estimate security requirements needed to execute a managed code for a developer prior to an actual execution of the managed code, comprising:
   simulating the execution of all calls from an assembly to another assembly for all execution paths of one or more assemblies in the managed code, wherein the assembly comprises one or more files versioned and deployed as a unit, wherein the managed code is a managed shared library or an executable, wherein all managed code is contained within the one or more assemblies, wherein the execution of each assembly is statically simulated without actually running a corresponding managed code to simulate all possible calls and corresponding flow of argument data;
   finding a set of required permissions for each execution path by one or more simulated stack walks that each include a plurality of the assemblies, wherein each call in each execution path has a corresponding permissions set, wherein each assembly has one or more execution paths representing a different data and a control flow, and wherein the simulated stack walk comprises:
      entering an execution path corresponding to a static simulation of execution of the assembly;
      entering a public entry point of a method in the assembly;
      gathering a permission set for the method in the assembly;
      determining whether the method in the assembly calls another method in the assembly or in an another assembly;
      gathering a permission set for the another method called by the method in the assembly; and
      creating a union of the gathered permission sets; and
   deriving the security requirements for execution paths corresponding to the one or more assemblies by using the union of the gathered permission sets across the execution paths corresponding to the one or more assemblies, wherein the union estimates the security requirements that will be triggered against the one or more assemblies during the actual execution of the one or more assemblies and whether a security exception will be triggered during the actual execution.

2. The method as defined in claim 1, wherein the execution paths for only one said assembly in managed code are simulated to find the set of required permissions for each said execution path by a union of the permissions for each said execution path.

3. The method as defined in claim 1, wherein:
   the one or more assemblies in managed code correspond to an application; and
   the set of required permissions for each said execution path comprises a union of the permissions for each said execution path.

4. The method as defined in claim 1, wherein:
   the assemblies in managed code correspond to a shared library; and
   the set of required permissions for each said execution path comprises one separate permission set per entry point in the shared library.

5. The method as defined in claim 1, wherein the set of required permissions for each said execution path comprises a union of the permissions for each said execution path.

6. The method as defined in claim 1, wherein one of more of the calls in at least one said execution path is a cross assembly call.

7. The method as defined in claim 1, wherein:
   the managed code is built to make use of a common language runtime;
   each said assembly is packaged as an executable entity or as a data link library entity and
   each said assembly includes one or more methods.

8. The method as defined in claim 7, wherein the simulation of the execution of each said execution path comprises a simulation of the flow of argument data using intra and extra method data flow analysis for each said method.

9. The method as defined in claim 1, wherein when the executable has permissions to execute that are not less than a union of permission sets for each said execution path, any dynamic execution of the executable will not trigger a security exception.

10. One or more computer storage media having a tangible component including machine readable instructions for implementing the method as defined in claim 1.

11. In a managed code environment, a method implemented on a computing device having instructions stored on a computer-readable storage media and executable by a processor, comprising:
   simulating calling from one assembly to another for which a permission set is required, wherein the simulation comprises one or more simulated stack walks that include two or more of the assemblies, each assembly being managed code in a library, wherein an execution of each assembly is statically simulated without actually running a corresponding managed code to simulate all possible calls and corresponding flow of argument data, and wherein the simulated stack walk comprises:
   entering a public entry point of a method in the assembly;
   gathering a permission set for the method in the assembly;
   determining whether the method in the assembly calls another method in the assembly or in an another assembly;
   for each called method:
   gathering a permission set for the another method called by the method in the assembly; and
   determining whether the another method calls a subsequent method in the assembly or in the another assembly; and
   creating a union of the gathered permission sets;
   repeating the calling for each assembly in the managed code and for all possible execution paths of the managed code;
   repeating the entering for each public entry point in the library;

finding the union of the permission sets corresponding to each call; and deriving security requirements for execution paths corresponding to the assemblies by using the union of the gathered permission sets across the execution paths corresponding to the one or more assemblies, wherein the union estimates the security requirements that will be triggered against the assemblies during an actual execution of the assemblies and whether a security exception will be triggered during the actual execution.

12. The method as defined in claim 11, wherein the managed code environment comprises:
 a managed code portion including:
  the assemblies; and
  a virtual machine;
 a native code portion including:
  an execution engine for the virtual machine; and
  an operating system under the execution engine.

13. The method as defined in claim 11, wherein:
 the managed code is built to make use of a common language runtime;
 each said assembly is packaged as a data link library entity and
 each said assembly includes one or more methods.

14. The method as defined in claim 11, wherein when the assemblies corresponding to the application have permissions to execute that are not less than the union of permission sets for each said execution path, any dynamic execution of the assemblies corresponding to the application will not trigger a security exception.

15. The method as defined in claim 11, wherein the managed code environment enforces partial trust security contexts.

16. One or more computer storage media having a tangible component including machine readable instructions for implementing the method as defined in claim 11.

17. One or more computer storage media having a tangible component comprising instructions that, when executed by a processor, perform a static simulation of an execution of every data and control flow for managed code from which an estimate is derived of the minimum security requirements needed to dynamically execute the managed code without triggering a security exception, the instructions comprising:
 simulating, statically, one or more stack walks for each data and a control flow for the managed code, wherein the managed code corresponds to one or more assemblies, wherein the one or more stack walks comprise two or more of the assemblies, and
 finding a set of required permissions for each execution path by the stack walks, wherein each call in each execution path has a corresponding permissions set, wherein each assembly has one or more execution paths representing a different data and control flow, and wherein the simulated stack walk comprises:
  entering a public entry point of a method in an assembly;
  gathering a permission set for the method;
  determining whether the method calls another method;
  for each called method:
   gathering a permission set for the called method; and
   determining whether the called method calls a subsequent method; and
  creating a union of the gathered permission sets; and
 deriving the security requirements for execution paths corresponding to the two or more assemblies by using the union of the gathered permission sets, wherein the union estimates the security requirements that will be triggered against the two or more assemblies during an actual execution of the two or more assemblies.

18. The one or more computer storage media as defined in claim 17, wherein:
 the managed code, which comprises a plurality of assemblies, is built to make use of a common language runtime;
 each said assembly is packaged as an executable entity or as a data link library entity and
 each assembly includes one or more methods.

19. The one or more computer storage media as defined in claim 17, wherein the dynamic execution of the managed code occurs in a managed code environment comprising:
 a managed code portion including:
  the managed code has one or more assemblies and is a library or an executable; and
  a virtual machine;
 a native code portion including:
  an execution engine for the virtual machine; and
  an operating system under the execution engine.

20. The one or more computer storage media as defined in claim 19, wherein:
 the managed code is built to make use of a common language runtime;
 each assembly is packaged as an executable entity or as a data link library entity and
 each assembly includes one or more methods.

21. The one or more computer storage media as defined in claim 19, wherein:
 each call in each simulated stack walk has a corresponding permissions set; and
 the derived estimate is a union of the permissions sets.

22. The one or more computer storage media as defined in claim 19, wherein the managed code environment enforces partial trust security contexts.

23. An apparatus comprising:
 means for processing;
 means for storing information in memory coupled to the means for processing;
 virtual machine means, stored in the memory, in a managed code portion, for operating a plurality of assemblies in managed code, wherein the managed code is a managed shared library or an executable and is in the managed code portion;
 execution engine means, in a native code portion, for executing the virtual machine means;
 means, in the native code portion, for providing an operating system;
 means for making a call in the managed code portion for access by one assembly to another assembly for which a permissions set is required;
 means in the managed code portion for gathering the permissions set from each call;
 means in the managed code portion for deriving a union of the gathered permissions sets;
 means in the managed code portion for statically simulating the execution of all possible execution paths for the managed shared library or the executable without actually running a corresponding managed code, to derive therefrom the derived union of the gathered permissions sets wherein the means for simulating the execution performs, for each execution path, one or more simulated stack walks that each include a plurality of assemblies, and wherein the one or more simulated stack walks comprise:

means for entering a public entry point of a method in the assembly;

means for gathering a permission set for the method;

means for determining whether the method calls another method;

for each called method:

means for gathering a permission set for the called method;

means for determining whether the called method calls a subsequent method;

means for repeating the previous gathering and determining until any gathered permission set is duplicative; and means for creating a union of the gathered permission sets; and means for deriving security requirements for execution paths corresponding to the plurality of assemblies by using the union of the gathered permission sets across the execution paths corresponding to the plurality of assemblies, wherein the union estimates whether a security exception will be triggered during an actual execution of the assemblies.

24. The apparatus as defined in claim 23, further comprising:

means for compiling the assemblies from an intermediate language code and metadata into native code; and means for loading the native code with a Common Language Runtime loader in the native code portion to load the compiled native code, wherein the execution engine means executes the compiled native code in the native code portion.

25. The apparatus as defined in claim 23, wherein the managed code portion further comprises one or more files associated with user code that, when compiled into an intermediate language code and metadata generated by a language compiler, are represented by the assemblies.

26. The apparatus as defined in claim 23, wherein the execution engine means in the native code portion further comprises a compiler to compile each said assembly into native code for execution by the native code portion.

27. The apparatus as defined in claim 23, wherein the execution engine means in the native code portion further comprises:

a Just In Time compiler to compile each said assembly into native code; and a common language runtime loader to load the compiled native code for execution by the native code portion.

28. The apparatus as defined in claim 23, further comprising:

means, in the native code portion, for forming a response to the call; and means for returning the response to the first assembly in the managed code portion.

29. The apparatus as defined in claim 23, wherein:

the managed code is built to make use of a common language runtime;

each said assembly is packaged as an executable entity or as a data link library entity; and each said assembly includes one or more methods.

30. The apparatus as defined in claim 29, wherein the simulation of the execution comprises, for each said execution path, a simulation of the flow of argument data using intra and extra data flow analysis for each said method.

31. The apparatus as defined in claim 23, wherein when the executable has permissions to execute that are not less than the union of the gathered permissions sets, any dynamic execution of the executable will not trigger a security exception.

32. The apparatus as defined in claim 23, wherein each call in each simulated stack walk has a corresponding permissions set.

33. The apparatus as defined in claim 23, wherein the managed code portion and the native code portion are in a managed code environment that enforces partial trust security contexts.

34. A computing device comprising:

a processor;

a memory coupled to the processor;

a managed code portion stored in the memory;

a native code portion stored in the memory; and an application program in the managed code portion comprising logic configured to:

statically simulate the execution of all possible calls from one assembly to another assembly for all possible execution paths of the managed code without actually running a corresponding managed code to simulate all possible calls and corresponding flow of argument data, wherein each assembly call has a corresponding permissions set, wherein the simulation of the execution comprises one or more simulated stack walks that each include a plurality of assemblies, and wherein the one or more simulated stack walks comprise:

a public entry point of a method in the assembly;

a permission set for the method;

a determination of whether the method calls another method;

for each called method:

a permission set for the called method;

a determination of whether the called method calls a subsequent method; and a totality of permission sets such that any subsequent permission set is duplicative; and a union of the permission sets;

derive a union of the permissions sets from each assembly call; and derive security requirements for execution paths corresponding to the plurality of assemblies by using the union of the permission sets across the execution paths corresponding to the plurality of assemblies, wherein the union estimates the security requirements that will be triggered against the one or more assemblies during an actual execution of the assemblies.

35. The computing device as defined in claim 34, wherein the managed code portion further comprises one or more files associated with user code that, when compiled into an intermediate language code and metadata generated by a language compiler, are represented by:

the assemblies in the executables; or the managed shared library.

36. The computing device as defined in claim 34, wherein the execution engine further comprises:

a compiler to compile each assembly into native code; and a common language runtime loader to load the compiled native code.

37. The computing device as defined in claim 34, wherein:

the managed code is built to make use of a common language runtime;

each assembly is packaged as an executable entity or as a data link library entity; and each assembly includes one or more methods.

38. The computing device as defined in claim 37, wherein the simulation of the execution comprises a simulation of the flow of argument data using intra and extra method data flow analysis for each said method.

39. The computing device as defined in claim 34, wherein when the executable has permissions to execute that are not less than the union of the permissions sets from each said assembly call, any dynamic execution of the executable will not trigger a security exception.

40. The computing device as defined in claim 34, wherein the managed code portion and the native code portion are in a managed code environment that enforces partial trust security contexts.

41. The method of claim 11, wherein the union of the permission sets separately identifies a permission set for each public entry point of the library.

* * * * *